Sept. 12, 1967 K. H. CASSON 3,341,021

MAGNETIC SEPARATOR

Filed May 5, 1964 6 Sheets-Sheet 1

INVENTOR
Kenneth H. Casson
by Wolfe, Hubbard, Voit & Osann
ATTORNEYS

INVENTOR
Kenneth H. Casson
by Wolfe, Hubbard, Voit & Osann
ATTORNEYS

Sept. 12, 1967 K. H. CASSON 3,341,021

MAGNETIC SEPARATOR

Filed May 5, 1964

6 Sheets-Sheet 3

INVENTOR
Kenneth H. Casson
by Wolfe, Hubbard, Voit & Osann
ATTORNEYS

MAGNETIC SEPARATOR

Filed May 5, 1964

INVENTOR

Kenneth H. Casson by Wolfe, Hubbard, Voit & Osann

ATTORNEYS

INVENTOR
Kenneth H. Casson
by Wolfe, Hubbard, Voit & Osann
ATTORNEYS

Sept. 12, 1967 K. H. CASSON 3,341,021

MAGNETIC SEPARATOR

Filed May 5, 1964 6 Sheets-Sheet 6

INVENTOR
Kenneth H. Casson
by Wolfe, Hubbard, Voit & Osann
ATTORNEYS

United States Patent Office
3,341,021
Patented Sept. 12, 1967

3,341,021
MAGNETIC SEPARATOR
Kenneth H. Casson, Winnebago, Ill., assignor to Barnes Drill Co., Rockford, Ill., a corporation of Illinois
Filed May 5, 1964, Ser. No. 365,009
19 Claims. (Cl. 210—222)

This invention relates to magnetic separators of the type including two spaced rotary disks partially submerged in liquid flowing through a tank with magnetic means on the disks creating a magnetic field between the disks for collecting magnetic particles from the liquid on the submerged portions of the opposed end walls of the disks. The disks are rotated through the liquid to pick up magnetic particles therein and carry the collected particles upwardly out of the liquid for removal from the disks.

The general object of the present invention is to provide a compact magnetic separator of the above character at a competitive cost and with increased liquid flow capacity and cleaning efficiency for a given overall size.

Another object is to utilize the available attractive force of the magnets on the disks to optimum advantage by concentrating the magnetic lines of the magnets in zones of high flux density between the disks.

A further object is to insure that all liquid and entrained magnetic particles flowing through the tank pass between the disks and thus are subjected to the attractive force of the magnets.

Still another object is to maintain a continuous concentrated magnetic field betwen the disks forming a curtain of magnetic lines through which the liquid must pass in flowing between the disks.

A related object is to pass the liquid more than once through such a concentrated magnetic curtain as the liquid flows through the separator whereby a rapid flow may be maintained and effectively cleaned.

Another object is to remove non-magnetic particles from the liquid by forming a mechanical strainer of magnetic particles in the liquid and passing all the liquid through the strainer.

A further object is to control the density of the mass of magnetic particles forming the strainer and thereby maintain a substantial volume of liquid flow through the separator.

The invention also resides in the scraper or plow for removing collected particles from the opposed walls of the disks and, at the same time, removing a substantial portion of the liquid from the particles before discharging the particles from the separator.

Other objects and advantages of the invention will become apparent from the following detailed description taken in connection with the accompanying drawings, in which FIGURE 1 is a fragmentary cross-sectional view taken in a vertical plane through a magnetic separator embodying the novel features of the present invention, the view being taken along the line 1—1 of FIG. 3.

Figure 1:
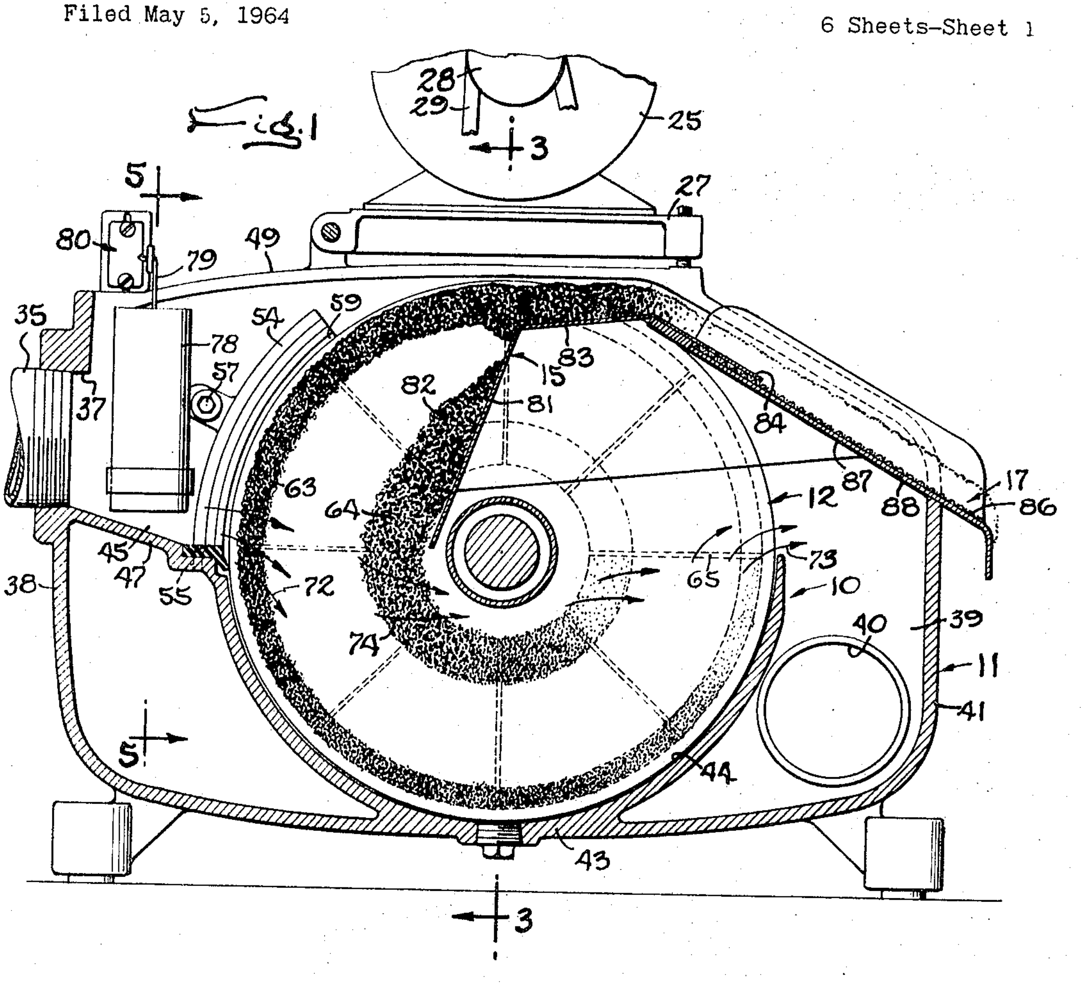

As shown in the drawings for purposes of illustration, the invention is embodied in a magnetic separator comprising a tank 10 formed in a housing 11, a rotary magnetic pick-up unit 12 including two axially spaced disks 13 rotatably mounted on the housing and partially submerged in liquid flowing through the tank, and magnetic means on the disks creating a magnetic field between the disks to attract magnetic particles in the liquid to and collect the particles on the submerged portions of the opposed end walls 14 of the disks. The latter are rotated through the liquid to carry collected particles or so-called swarf upwardly out of the liquid to a stationary scraper or plow 15 disposed between the disks with its side edges closely adjacent the opposed walls of the disks. The scraper is inclined outwardly across the path of the swarf on the disks to remove swarf from the disks and carry the swarf onto a discharge chute 17.

Figure 3:
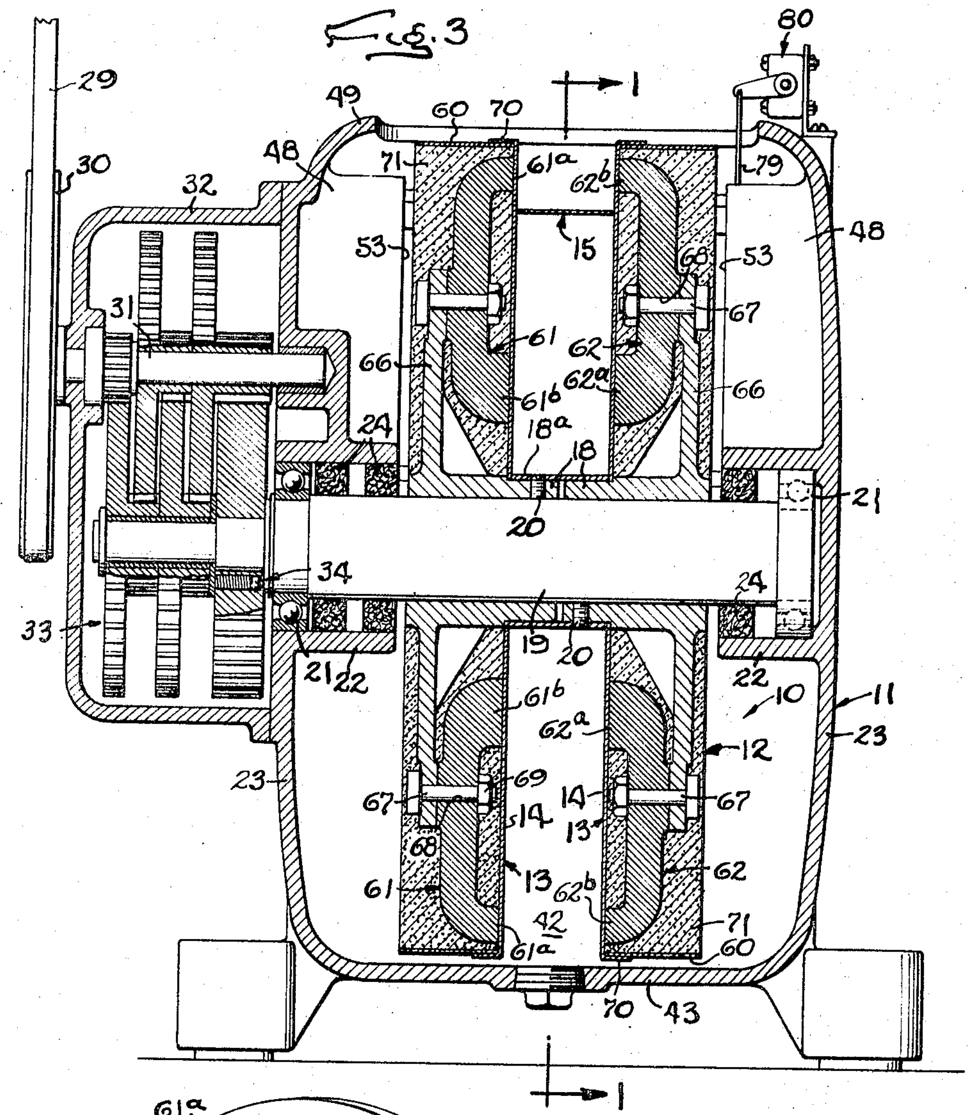
FIG. 3 is an enlarged cross-sectional view taken along the line 3—3 of FIG. 1.
Figure 4:
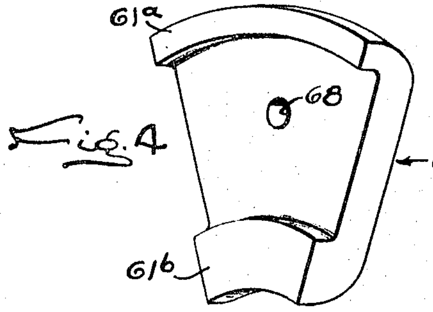
FIG. 4 is a perspective view of one of the magnets shown in FIG. 3.

In this instance, the disks 13 are mounted on sleeves 18 (see FIG. 3) which telescope onto a horizontal supporting shaft 19 and are held in place intermediate the ends of the shaft by set screws 20 threaded into the sleeves and tightened against the shaft to hold the disks in properly spaced relation on the shaft. The shaft 19 is journaled on the housing in spaced bearings 21 (FIG. 3) fitted in cylindrical flanges 22 projecting inwardly from the sidewalls 23 of the housing 11 adjacent the top of the tank 10 and telescoping over the opposite end portions of the shaft. Suitable seals 24 between the flanges and the shaft prevent leakage of liquid out of the tank around the shaft.

To rotate the pick-up unit 12, an electric motor 25 (FIG 1) is supported above the housing 11 on a platform 27 with a pulley 28 on the motor shaft driving a V belt 29 trained around a second pulley 30 (see FIG. 3) on the outer end portion of a second shaft 31 journaled in a gear box 32 on one side of the housing. This shaft rotates the shaft 19 and the disks 13 clockwise about the shaft axis as viewed in FIG. 1 through reduction gearing 33 in the gear box coupled to the shaft by a clutch formed by a series of spring-loaded ball detents 34 which seat in notches in a shoulder near the left end of the shaft 19. In case abnormal resistance to turning of the pick-up unit 12 is encountered in service use, the clutch slips before damage to the drive occurs.

Dirty liquid is delivered to the tank 10 through a pipe 35 threaded into an inlet opening 37 in the left end wall 38 of the housing 11 as viewed in FIG. 1, and flows to the right through the tank to an outlet chamber 39 and an outlet opening 40 adjacent the right end wall 41 of the housing. From the outlet opening, clean liquid is returned to the sump or reservoir (not shown) of the associated machine. In one of its aspects, the present invention contemplates a novel arrangement of the disks 13 in the tank to insure that all the liquid and entrained particles entering the tank pass between the disks and through the magnetic field between the disks. To this end, the inlet and the outlet are disposed on opposite sides of the rotary pick-up unit 12 and all the incoming liquid is delivered to the left end of the transaxial channel 42 defined between the lower portions of the disks and is confined to a path leading through the channel toward the opposite side of the pick-up unit. Accordingly, all liquid must pass through the channel and the magnetic field therein in flowing through the tank.

In this instance, the bottom of the tank 10 is formed by an imperforate arcuate wall 43 spanning the sidewalls 23 of the housing and curving downwardly from the left side of the pick-up unit 12 under the disks 13 and then upwardly on the other side to form a semi-cylindrical upwardly opening trough in which the lower portions of the disks are disposed with the peripheries of the disks closely adjacent the inside surface 44 of the tank wall. Semi-circular portions of the housing sidewalls form the sidewalls of the tank.

To deliver all the incoming dirty liquid to the channel 42 between the pick-up disks 13, an inlet passage 45 is formed between the inlet opening 37 and the adjacent side of the tank 10 by an upwardly facing bottom wall 47 spanning the sidewalls 23 of the housing and preferably integrally joined to the left wall 38 of the housing below the inlet opening and to the adjacent end of the arcuate tank wall 43. The inlet opening is somewhat higher than the adjacent end of the tank wall and the bottom wall of the inlet passage slopes downwardly from the inlet opening to the tank. Projecting inwardly toward each other from the sidewalls of the housing at the right hand end of the inlet passage are two arcuate ribs 48 (see FIG. 9) which follow the curvature of the disk peripheries and terminate at their upper ends adjacent the top wall 49 of the housing. These ribs constitute upward extensions of the arcuate tank wall 43 and are spaced laterally apart to cooperate with the left end of the wall 47 and define an inlet notch opening from the passage 45 toward the channel 42 to admit dirty liquid into the channel. To prevent liquid from flowing from the inlet notch outwardly around the pick-up unit 12 or downwardly beneath the unit, means is provided to seal the clearances between the notch walls and the disks thereby blocking all flow paths from the notch into the tank except the path leading into the channel.

Figures 5, 6, 7, 8:
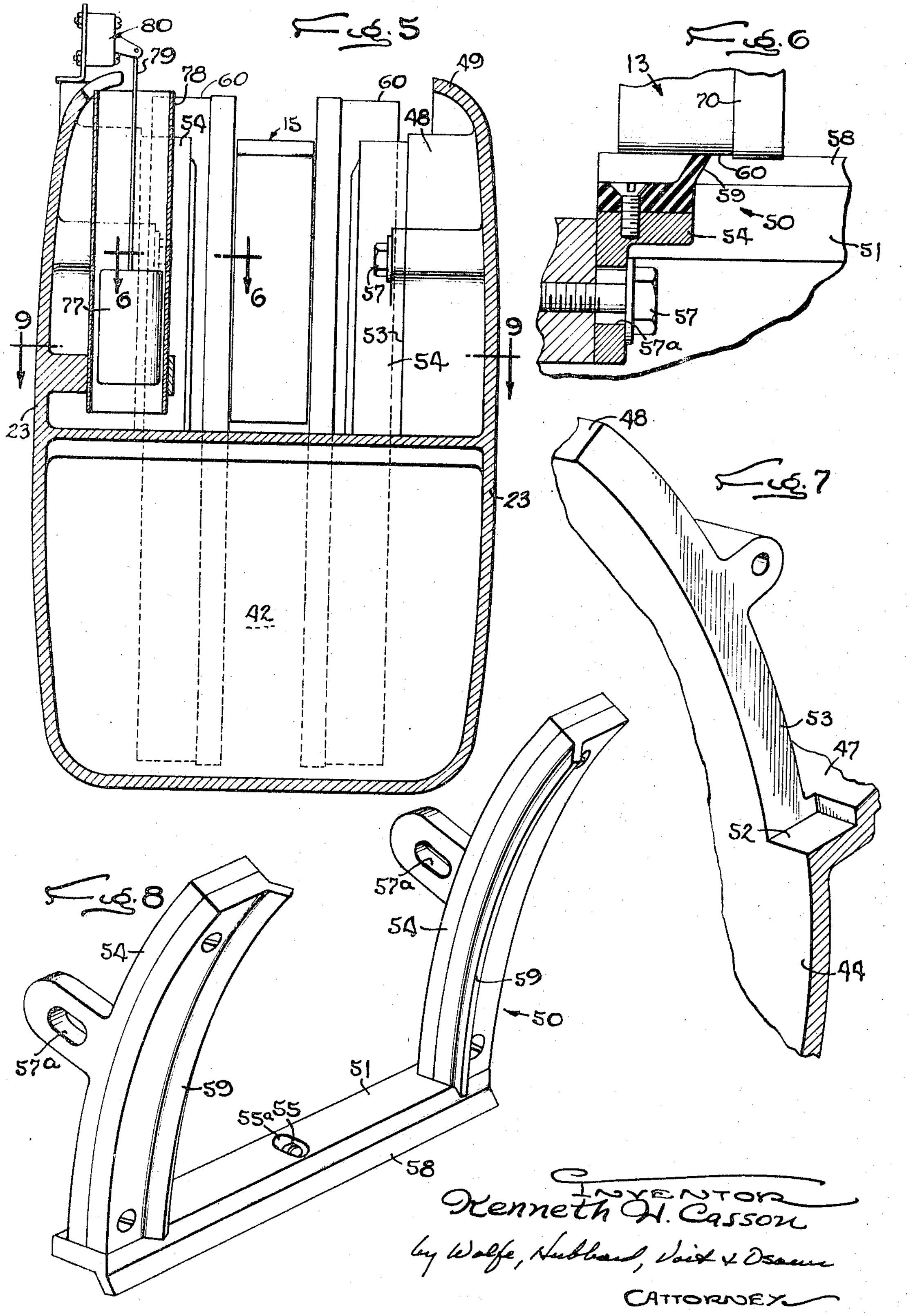
FIG. 5 is an enlarged fragmentary cross-sectional view taken substantially along the line 5—5 of FIG. 1.
FIG. 6 is an enlarged fragmentary cross-sectional view taken along the line 6—6 of FIG. 5.
FIG. 7 is an enlarged fragmentary perspective view of a portion of the separator housing shown partly in cross-section.
FIG. 8 is an enlarged perspective view of the sealing member.

Herein, the seals are formed by a generally U-shaped member 50 (see FIG. 8) including a horizontal crossbar 51 which seats in a recess 52 (FIG. 7) at the end of the passage walls 47 and abuts at its opposite ends against the opposed surfaces 53 of the arcuate ribs 48. Two arcuate bars 54 extend upwardly from the ends of the crossbar along the opposed rib surfaces. The arcuate bars and the cross bar herein are separate pieces fastened to and clamped into tight sealing engagement with the ribs and the bottom of the recess 52 by screws 55 and 57 (FIGS. 1 and 6) extending through elongated slots $55^a$, and sealing strips 58 and 59 formed with resiliently flexible sealing flanges are fastened to the bars with the flanges projecting to the right toward and pressed tightly against the peripheral surfaces 60 of the disks. The slots $55^a$ and $57^a$ permit individual adjustment of the three pieces of the seal member toward or away from the pick-up unit for proper engagement of the sealing strips with the disks. Thus, the horizontal sealing strip prevents the liquid from flowing downwardly until the liquid has passed between the disks and into the channel, and the two upright sealing strips prevent liquid from flowing around the outer end walls of the disks. Accordingly, liquid flowing through the inlet passage 45 must flow over the horizontal sealing strip and between the disks 13 and all particles in the liquid are carried into the channel 42 and through the magnetic field between the disks.

In accordance with a primary aspect of the invention, the magnetic field between the disks 13 is created by a plurality of angularly spaced U-shaped magnets 61, 62 mounted on each of the disks with the pole faces of each magnet disposed adjacent the plane of the inner disk wall 14 in alinement with the opposite poles of a magnet on the other disk, and the spacing of the poles of each opposed pair is less than the distance between the poles of each individual magnet. With this arrangement, the two opposed poles of each pair cooperate with each other to concentrate the magnetic flux lines of the two magnets in the portion of the channel 42 between the two poles. In other words, each pole acts to draw the magnetic lines of the other magnet into the zone directly between the poles and reduce the amount of so-called stray flux which, due to its wide distribution, is relatively ineffective for the purpose of collecting swarf.

Figure 9:
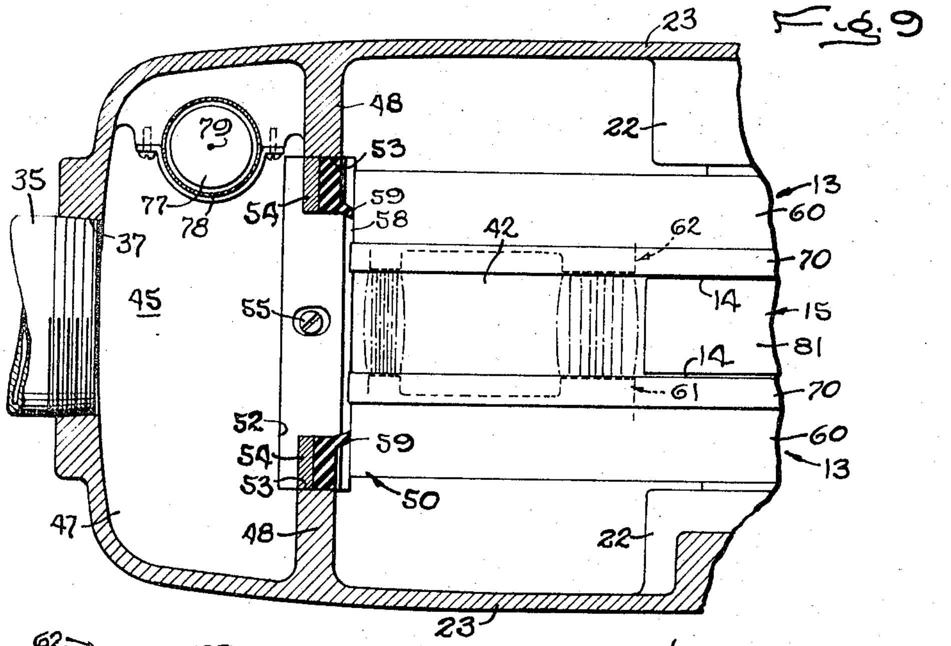
FIG. 9 is a fragmentary cross-sectional view taken along the line 9—9 of FIG. 5.

It will be seen that the normal magnetic circuit of each individual magnet 61, 62 is changed by the proximity of the opposed poles of the other magnet. Instead of passing in wide curves from the N-pole of the magnet to the S-pole of the same magnet, the magnetic lines are nearly straight as shown in FIG. 9 and pass from the N-pole of one magnet through the narrower gap formed by the channel 42 to the opposed S-pole of a magnet on the other disk, then through the other magnet to its N-pole, and then back across the short gap to the S-pole of the first magnet. Accordingly, the attractive force of each magnet is concentrated in a zone of high flux density and is utilized to optimum advantage in collecting swarf on the disks. In addition, the close spacing of the disks 13 and the opposed magnet poles insures that all particles pass close to the poles. Of course, the attractive force of a magnet decreases sharply as the distance from its pole increases so the foregoing arrangement confines the liquid flow to the zone of strongest magnetic attraction.

While the magnets 61, 62 may be arranged in various ways on the two disks 13 to position opposite poles in closely spaced opposing relation, in the preferred embodiment of the invention shown in FIGS. 1 through 12, the poles of each magnet are spaced radially apart with the outer poles $61^a$, $62^b$ adjacent the periphery of the disk and the inner poles $61^b$, $62^a$ spaced inwardly and disposed between the outer poles and the hub of the rotary pick-up unit. Positioned in this manner, the magnets collect swarf on the walls 14 of the disks along two radially spaced annular areas of the disks.

In accordance with another aspect of the invention, the magnets 61, 62 are constructed and arranged on the disks 13 in a novel manner to form two sets of substantially continuous radially spaced annular pole faces on each disk and eliminate all gaps of significant size in the magnetic fields between the disks thereby collecting swarf on two continuous rings 63 and 64 on each disk and insuring effecting removal of substantially all of the entrained particles in the liquid. To achieve the foregoing, each magnet is made generally in the shape of a sector of a circle and is formed with two arcuate pole faces as shown most clearly in FIG. 4. These faces extend through equal angles but are of different circumferential length due to the greater spacing of the outer pole face $61^a$, $62^b$ from the center of the arc. To maintain comparable flux densities at the two faces, the inner face $61^b$, $62^a$ is of sufficiently greater radial thickness to compensate for its shorter length and give it approximately the same area as the outer face.

Herein, the magnets are cast of suitable permanent magnet material such as Alnico and are U-shaped in radial cross-section, the two short axially extending legs of the U terminating in the two pole faces. The magnets 61 are formed with outer N-poles $61^a$ and inner S-poles $61^b$ and the polarity of the magnets 62 is the reverse.

As shown in FIG. 1, eight magnets are arranged in an annular series on each disk with adjacent magnets disposed in closely spaced side-by-side relation and with the inner and outer pole faces forming concentric rings coaxial with the rotary pick-up unit and interrupted only by small gaps 65 on the order of ⅛ inch left between adjacent magnets to facilitate the mounting of the magnets on the disks. The effect of these gaps on the magnetic fields is negligible since the flux lines spread sufficiently to cover the gaps. It will be apparent that a single circular magnet with continuous radially spaced poles could be used on each disk to achieve the same effect. Sector-shaped magnets, however, are more readily available and are easy to install.

To support the sector-shaped magnets in this relationship, radial spokes 66 (FIG. 3) on the sleeves 18 project outwardly within the disks 13 and each magnet is fastened to the outer end of one of these spokes by means of a bolt 67 inserted through a hole adjacent the end of the spoke and through an alined hole 68 (FIG. 4) cast in the magnet. Nuts 69 threaded onto the bolts clamp the magnets against the spokes. The illustrative disks are completed by non-magnetic shells each comprising a thin circular face plate telescoped over the sleeve 18 and engaging the pole faces of the magnets to form the wall 14, a thin cylindrical ring telescoped into an annular flange 70 around the face plate to form the peripheral surface 60, and a body of non-magnetic filler material 71 such as concrete or foam which is cast in the non-magnetic shell around the magnets. A thin sleeve 18$^{a}$ telescoped over the sleeves 18 abuts against the face plates and spaces the latter apart. The face plates thus constitute neat appearing and wear resistant surfaces from which the collected swarf may be easily removed, and the cast filler material covers the magnets, except for the pole faces, and fills the gaps 65 thereby preventing swarf from entering the shells, building up on the the magnets, and short-circuiting the latter.

During normal operation, dirty liquid is fed into the inlet passage 45 through the inlet pipe 35 and flows through the seal member 50 into the left-hand end of the channel 42 and between the disks 13, finally spilling over the right-hand end of the tank into the outlet chamber 39 for removal through the outlet opening 40. At the same time, the pick-up unit is rotated clockwise by the motor 25 to move the lower portions of the disks through the liquid in the tank in a direction opposite the direction of liquid flow.

Figures 14, 15:
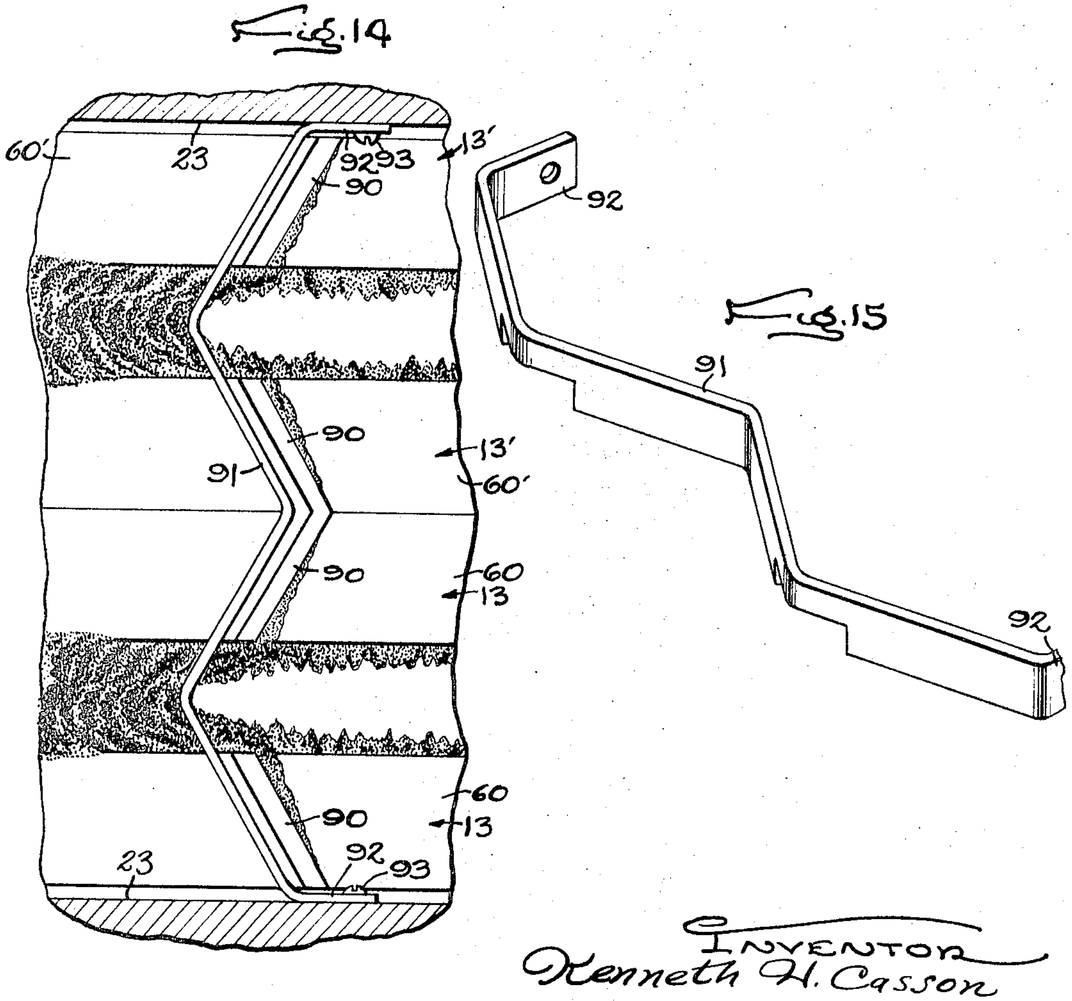
FIG. 14 is a fragmentary plan view of the apparatus shown in FIG. 13 with the sidewalls of the housing shown in section.
FIG. 15 is a perspective view of the wiper support shown in FIGS. 13 and 14.

Since the outer pole faces 61$^{a}$, 62$^{b}$ of the magnets on the disks 13 are interrupted only by the small gaps 65 which are covered by magnetic lines from the magnets on each side of the gaps, all the liquid flowing through the inlet passage 45 passes through a concentrated curtain of magnetic lines upon entering the channel 42 as indicated by the arrows 72 in FIG. 1, and again as it flows out of the channel as indicated by the arrows 73. In addition, a large portion of the liquid also flows through the magnetic field created by the inner poles 61$^{b}$, 62$^{a}$, of the magnets as indicated by the arrows 74 and thus is subjected four times to magnetic forces in passing through the tank. It should be apparent that this arrangement, with its repeated passing of particles through concentrated magnetic fields, is extremely effective in removing magnetic particles from the liquid, even when the latter flows rapidly through the channel. As a result, the separator has a large capacity. For example, one pair of twelve inch diameter disks 13 spaced 1¼ inches apart and having an overall axial width on the order of four inches easily handles twenty gallons per minute. Moreover, the capacity of the separator may be increased by adding one or more similar pairs of coaxial disks 13' as illustrated in FIG. 14 to increase the number of flow channels. Even with two flow channels, the separator is of compact construction that will fit readily into available space in most installations in service use.

The amount of build up of swarf in the rings 63 and 64 depends upon the amount of swarf in the dirty liquid delivered to the tank 10 and also on the speed of rotation of the disks 13. Of course, swarf begins to build up on an area of a disk after that area enters the liquid at the right-hand side of the tank below the scraper 15, and progressively increases as the area moves to the left, as shown in FIG. 1, attaining the greatest thickness as the area moves upwardly out of the liquid at the left-hand side of the tank.

Figure 10:
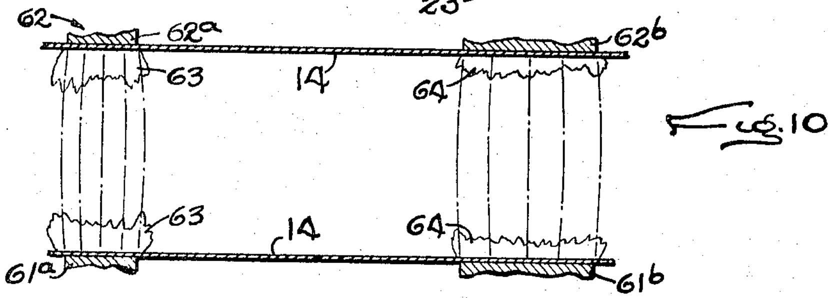
FIGS. 10 through 12 are enlarged fragmentary schematic views illustrating different degrees of swarf build-up on the disks.
Figure 11:
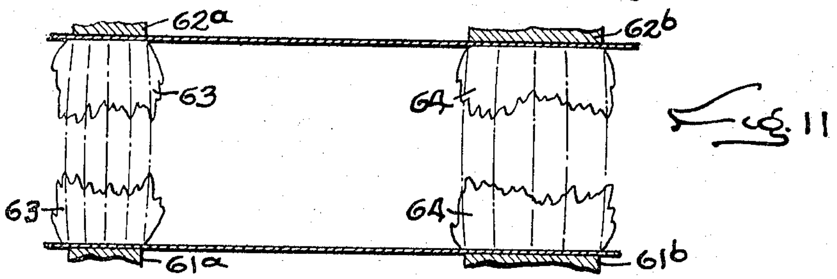

Preferably, the speed of rotation of the pick-up unit 12 is correlated with the average rate of delivery of swarf to the tank 10 in the particular installation to prevent the swarf from building up on the disks sufficiently to bridge the channel 42. The swarf tends to form thin magnetically permeable strings spanning the channel, and such strings, if permitted to form, gather magnetic lines from the zone of concentration and thereby weaken the field. When a rapid flow of liquid through the channel is maintained, however, the flow either breaks such strings or prevents their formation to maintain a substantial gap between the alined swarf rings on the two disks. The preferred average swarf build up is illustrated in FIG. 10 and the preferred maximum swarf build up permitted during normal operation is shown in FIG. 11. Because the swarf rings become magnetic poles by induction, it is believed that the narrowing of the effective gap between each pair of opposed poles as the swarf thickness increases reduces the reluctance of the gap and thus enhances the effectiveness of the magnetic force within the gap.

Figure 12:
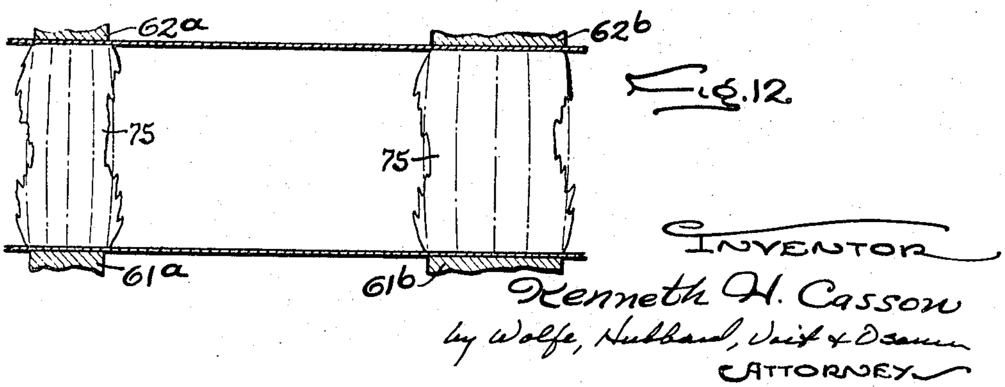

On the other hand, the cleaning action may be enhanced in some installations by permitting swarf bridges 75 to build up in the manner illustrated in FIG. 12. Such bridges are formed when the pick-up unit is rotated intermittently or very slowly through the liquid, and extend downwardly from the scraper 15 in a continuous arc to a point well below the surface of the liquid in the tank 10. Accordingly, all liquid entering the channel 42 must pass through the outer swarf ring 63 which acts as a mechanical strainer for removing non-magnetic material such as abrasive particles along with the collected magnetic particles.

As the density of the swarf mass increases, however, resistance to flow through the channel 42 also increases and reduces the volume of liquid passing through the channel. As a result, the flow capacity of the separator is reduced and liquid backs up in the inlet passage 45. To achieve a controlled straining action, the separator is provided with means for sensing the degree of clogging of the channel and controlling the rotation of the pick-up unit 12 in response to such clogging to maintain a swarf bridge 75 sufficiently porous to permit a substantial rate of flow through the channel. Herein, this means comprises a float 77 (see FIG. 5) disposed within a vertical tube 78, the open lower end of which is beneath the level of the liquid in the inlet passage 45, and connected by a rod 79 to the arm of a switch 80 to close the latter when the liquid in the inlet passage reaches a predetermined level thereby activating the motor 25 to rotate the pick-up unit. When the liquid level falls to a second predetermined level, indicating that the density of the swarf bridge has been reduced sufficiently to restore the desired flow, the float opens the switch to deactivate the motor and stop the rotation of the pick-up unit. Such intermittent rotation of the pick-up unit continues under the control of a float 77 and the switch 80 to maintain a swarf strainer across the inlet passage while, at the same time, maintaining a reasonably high rate of liquid flow through the channel. The arcuate sealing arms 54, 59 of the sealing member 50 project upwardly beyond the highest level attained by the liquid during such intermittent operation.

Figure 2:
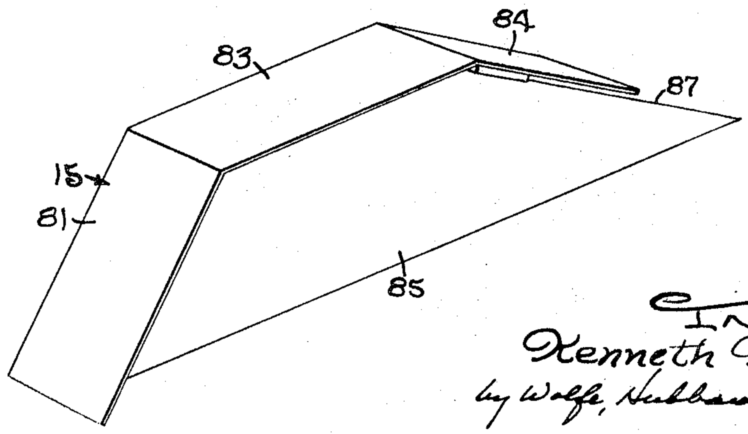
FIG. 2 is a perspective view of the plow.

The scraper or plow 15 for removing the collected swarf from the exposed portions of the disks 13 and feeding the swarf onto the discharge chute 17 also acts in this instance to hold the swarf from the inner rings 64 in a draining position above the normal level of the liquid before feeding the inner rings gradually into the outer rings to force both swarf rings together between the two disks and squeeze out a large part of the liquid carried upwardly with the swarf. As shown in FIGS. 1 and 2, the plow includes a generally upright inner portion 81 which extends downwardly and inwardly on the left-hand side of the shaft 19 inside the inner swarf rings 64 and is inclined upwardly to the right, in the direction of rotation of the disks 13, at a relatively steep angle on the order of seventy degrees. This portion terminates below the outer swarf rings 63 and thus acts only on the inner rings.

When the collected particles carried upwardly out of liquid by the inner magnet poles 61$^b$ and 62$^a$ are pressed against the opposite side edge portions of the inner portion 81, they are blocked by the latter as shown in FIG. 1 and begin to pile up on the plow at 82. As additional swarf piles up beneath this mass, the small upward component of force on the mass exerted by the upwardly moving magnets and by the disks tends to raise the mass along the plow. Due to the steep slope, however, upward motion along the plow is slower than the rate of addition of swarf to the mass. Thus, the swarf in the mass is squeezed and compacted both by the action of the magnets in pressing the swarf toward the plow and also by the action of the swarf accumulating from below. These combined forces and the delay in the draining position result in drainage of a substantial amount of liquid from the swarf and not only save coolant but also reduce the problems involved in disposing of waste.

As the slow upward motion of the mass continues, the swarf on top of the mass moves into the range of the outer magnetic poles 61$^a$, 62$^b$ and, instead of being pushed upwardly by the swarf below, is pulled upwardly by the attractive force of the outer poles. It has been found that relatively large bunches of swarf are pulled off the top of the mass and jump outwardly to join the outer rings. Thus, the mass of swarf in the outer rings is approximately doubled near the tops of the disks 13 and is squeezed between the adjacent walls 14 of the disks.

To remove the outer swarf rings 63 from the disks 13, the plow 15 includes an outer portion 83 connected to the top of the inner portion and inclined upwardly to the right and across the paths of the outer swarf rings at a lesser slope than the slope of the inner portion. The outer portion deflects the swarf gradually upwardly and outwardly from between the disks to apply a further squeezing force to the swarf while lifting all the collected swarf free of the disks and onto a third portion 84 of the plow. This portion slopes downwardly and delivers the swarf to the upper end of the discharge chute 17.

The three sections of this stepped plow 15 preferably are formed in one piece as shown in FIGS. 1 and 2 and braced in the desired angular relation by a polygonal plate 85 disposed in a vertical plane midway between the side edges of the two plow portions 81 and 83. The forward and top edges of the brace plate are disposed at the desired angle between the plow portions and abut against the undersides thereof, and the rear edge 87 of the brace plate is spaced below the portion 84 by a spacer plate as shown in FIGS. 1 and 2 and thereby is positioned to abut against the underside of the inclined plate 88 forming the bottom of the discharge chute. Thus, the portion 84 and the rear edge of the brace plate slide respectively over and under the upper end of the chute to straddle the latter with a close fit and thus support the plow assembly cantilever fashion over the rotary pick-up unit. It will be evident that removal and replacement of the assembly are very simple operations with this construction. The top of the chute may be covered by a screen 86 (FIG. 1) which permits liquid to drain from the swarf on the chute.

Figure 13:
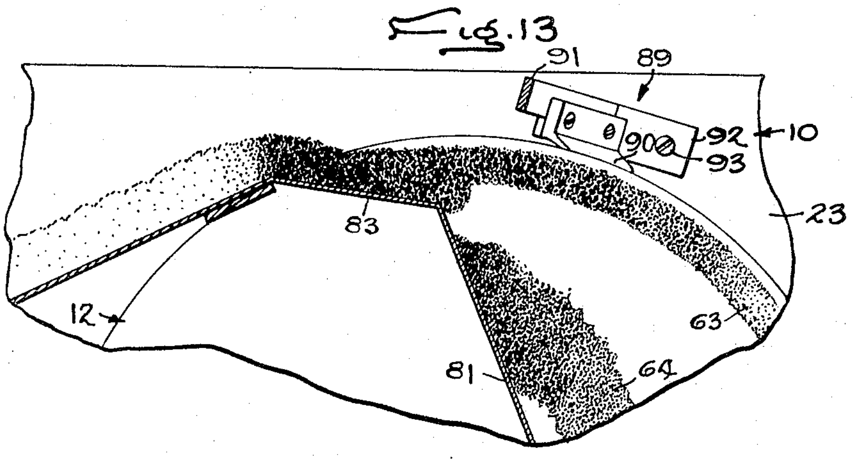
FIG. 13 is an enlarged fragmentary view generally similar to a portion of FIG. 1 and showing a modification.

While the close spacing of the opposed magnetic poles on the disks 13 concentrates the flux lines in the zones between the poles, a certain amount of stray flux will exist and will cause swarf between the rings on each face plate and also on the peripheral surfaces 60 of the disks. To remove both the swarf and any liquid carried out of the tank on the peripheral surfaces, a wiper 89 (FIGS. 13 through 15) may be mounted on the tank 10 above the rotary pick-up unit 12 with portions 90 disposed in wiping engagement with the peripheral surfaces 60 and 60' of the disks and positioned to wipe liquid and swarf into the space between the disks. Thus, most of this liquid returns to the tank with the liquid squeezed from the swarf rings by the plow 15.

Herein, the wiper 89 comprises a zig-zag bar 91 formed with end flanges 92 fastened by screws 93 to the sidewalls 23 of the tank 10, and the wiping portions 90 are strips of resilient material such as rubber fastened to the bar above the respective disks 13 and 13' with the lower edges of the strips pressed tightly against the surfaces 60, 60'. To direct swarf into the space between the disks, the two strips above each pair of disks converge toward each other in the direction of rotation of the disks so that swarf rolls along the strips and is guided laterally off the latter.

Figure 16:
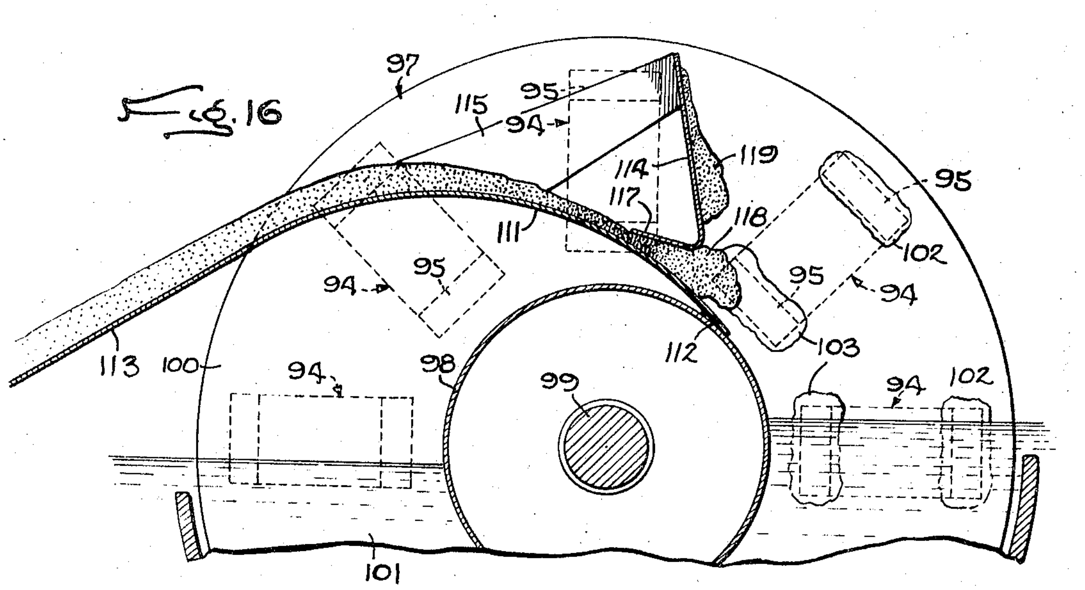
FIG. 16 is a fragmentary schematic view generally similar to a portion of FIG. 1 and showing an alternate form of the invention.

An alternative form of the invention is shown in FIG. 16 in which two sets of conventional horseshoe magnets 94 having rectangular pole faces 95 are mounted on two axially spaced disks 97 with the poles of each magnet radially spaced apart and aligned with opposite poles of a magnet on the other disk. Again, the poles of each alined pair are spaced apart across the channel a distance less than the spacing of the poles of each individual magnet to concentrate the flux lines in the channel in the zone directly between the poles. A sleeve 98 of substantially larger diameter than the supporting shaft 99 and preferably composed of non-magnetic material is telescoped over the shaft and sealed at its ends against the opposed walls 100 of the disks to reduce the radial width of the flow channel 101. The construction of the disks and operation of this alternate form are the same in all other important respects as in the preferred form except that the magnetic fields between the disks are interrupted by the larger gaps between adjacent magnetic poles on each disk and swarf is collected in radially spaced and circumferentially interrupted masses 102 and 103 as shown in FIG. 16.

Figure 17:
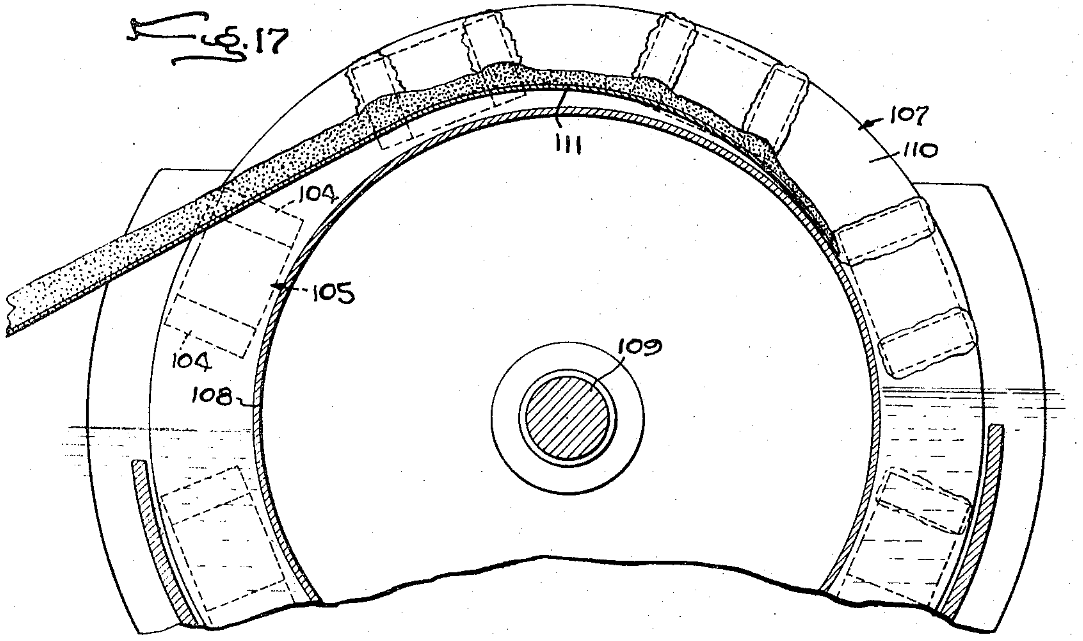
FIG. 17 is a schematic view generally similar to FIG. 16 and showing another form of the invention.

Another form is illustrated in FIG. 17. In this instance, the poles 104 of each U-shaped magnet 105 are spaced apart circumferentially of the associated disk 107 a distance greater than the axial spacing of the disks. Thus, the magnetic lines are concentrated in radially extending zones equal in length to the length of the poles and angularly spaced around the disks. To insure that all entrained magnetic particles pass through at least one of these zones, the outer ends of the poles are positioned closely adjacent the peripheries of the disks and a non-magnetic sleeve 108 having an outside diameter approximately the same as the diameter at the inner ends of the poles is telescoped over the supporting shaft 109 and sealed against the opposed end walls of the disks 110. Thus, liquid flowing through the channel must pass between at least one pair of poles and more likely will pass between several pairs.

An alternate plow also is shown in FIG. 16. In this instance, a curved plate 111 is disposed between the disks 97 with its opposite edges adjacent the disk walls 100 and with its inner end 112 spaced radially inwardly from the swarf collected at 103 on the inner magnet poles 95. The plate curves upwardly and radially outwardly across the paths followed by the swarf on both the inner and outer poles, and then curves downwardly to the upper end of the discharge chute 113. To reduce the amount of coolant carried out of the tank with the swarf, a second nearly upright scraper plate 114 is supported above the inner end portion of the curved plate on an arm 115 fastened at one end of the curved plate and at the other end of the back of the other plate. A flange 117 on the lower edge of the plate 114 forms a pressure shoe converging rearwardly toward the curved plate and cooperating with the latter to form a restricted throat through which the swarf passes. Swarf piles up in advance of the throat as indicated at 118 and then is forced gradually through the throat by the magnets 94 and by the oncoming swarf on the curved plate. Both plates and the flange preferably are composed of stainless steel.

The upper plate 114 also is inclined upwardly and in the direction of rotation of the disks with a relatively steep slope so that swarf 102 on the outer poles is collected in a mass 119 and held in a draining position in a manner similar to the collection of the swarf of the inner rings 64 in the preferred form of the plow. Part of this mass is pushed slowly over the top of the upper plate to fall onto the curved plate after most of the liquid has drained out, and some works downwardly and passes through the restricted throat beneath the flange 117. In both cases, a large portion of the liquid in the swarf is removed and returned to the tank.

I claim as my invention:

1. A magnetic separator having, in combination, a tank, two upright disks rotatably supported in said tank in spaced side-by-side relation and having opposed end walls the lower portions of which define a channel in said tank for the flow of liquid containing magnetic particles transaxially of said disks, a series of angularly spaced U-shaped magnets carried by each of said disks with the poles of each magnet disposed adjacent the plane of the disk wall and each substantially alined with an opposite pole of a magnet on the other disk, the spacing of each pair of alined poles being less than the distance between the poles of each magnet whereby each pair of alined poles causes a concentration of flux lines to span said channel and attract magnetic particles to said disk walls, and means for delivering liquid containing magnetic particles to one end of said channel and withdrawing liquid from said tank adjacent the other end of the channel thereby to induce a flow of liquid through the channel of said disks.

2. A magnetic separator as defined in claim 1 in which a plurality of magnets are angularly spaced apart around each disk and the poles of each magnet are spaced radially apart to collect particles along two radially spaced areas of each disk.

3. A magnetic separator as defined in claim 2 in which each of said magnets is generally in the shape of a sector of a circle and has inner and outer arcuate poles of equal angular length, the magnets on each disk being disposed in closely spaced side-by-side relation with the inner poles and the outer poles forming two substantially continuous and concentric rings.

4. A magnetic separator as defined in claim 3 in which the inner and outer poles of each magnet have approximately the same areas to create magnetic fields of comparable flux density.

5. A magnetic separator having, in combination, a tank, two disks rotatably supported in said tank in spaced upright planes and having opposed end walls the lower portions of which define a channel in said tank for the flow of liquid between said walls transaxially of said disks, magnetic means of opposite polarity on said walls creating flux lines extending between said disks to attract magnetic particles in said channel to said walls, means for delivering liquid containing magnetic particles to one end of said channel and withdrawing liquid from said tank adjacent the other end of the channel thereby to induce a flow of liquid through said tank transaxially of said disks, said delivery means including an inlet passage having side and bottom walls and opening into said one channel end, and means forming seals between the peripheral portions of said disks and said passage walls and preventing incoming liquid from flowing around and beneath said disks thereby to insure that all liquid delivered to said tank flows into said channel, said magnetic means including two opposed and substantially continuous annular polarized areas extending around said disk walls closely adjacent said peripheral surfaces whereby liquid flowing from said passage into said channel must pass at least twice though magnetic fields before leaving said tank.

6. A separator as defined in claim 5 in which said magnetic means also includes two additional opposed and substantially continuous annular polarized areas extending around said disk walls and spaced radially inwardly from the first-mentioned areas whereby a substantial portion of said liquid flows four times through magnetic fields.

7. A magnetic separator as defined in claim 5 in which said sealing means comprises a generally U-shaped member having a crosspiece spanning said disks at said one channel end and pressed into tight sealing engagement with said bottom wall and with the peripheral surfaces of the disks on opposite sides of the channel, and having arcuate legs extending upwardly from the ends of said crosspiece along said surfaces and pressed into tight sealing engagement with said surfaces and with said sidewalls.

8. A magnetic separator as defined in claim 7 in which the seals are effected by resiliently flexible sealing strips on said crosspiece and said legs pressed tightly against said surfaces.

9. A magnetic separator as defined in claim 8 in which said crosspiece and said legs are adjustable individually on said passage walls toward and away from said disks.

10. In a magnetic separator, the combination of, two disks disposed in spaced side-by-side relation and having opposed end walls defining a channel between them for the flow of liquid containing magnetic particles, and an annular series of permanent magnets carried by each of said disks, each of said magnets being shaped as a sector of a circle and having radially spaced inner and outer arcuate pole faces of equal angular length disposed adjacent the plane of the disk end wall, and the magnets on each disk being arranged in closely spaced edge-to-edge relation with the inner and outer pole faces thereof forming radially spaced substantially continuous and concentric rings of opposite polarity each facing toward a ring of opposite polarity on the other disk.

11. A magnetic separator as defined in claim 10 in which the inner and outer pole faces are of approximately equal areas to create magnetic fields of comparable flux density.

12. In a magnetic separator, the combination of, a tank, two disks rotatably supported in spaced side-by-side relation with the lower portions of the disks defining a channel for the flow of fluid containing magnetic swarf and non-magnetic particles, magnetic means on said disks for collecting said swarf on the opposed walls of the disks along opposed annular areas adjacent the peripheries of the disks, means for causing a flow of said liquid through said tank and said channel including an inlet passage at one end of said channel communicating with the latter whereby swarf bridges said disks and forms a mechanical strainer in said liquid while said disks are stationary, means for sensing the density of the swarf mass between said disks and producing signals indicating a predetermined degree of clogging of said channel by swarf, selectively operable mechanism for rotating said disks intermittently in one direction through said liquid to carry collected swarf out of the liquid, and means responsive to said signals and operable to activate said mechanism to rotate said disks until the density of said mass is reduced and normal flow through said channels is restored.

13. A magnetic separator as defined in claim 12 in which said disks are rotated in a direction to move said swarf mass upwardly across said inlet passage thereby to strain non-magnetic particles entering said channel.

14. A magnetic separator as defined in claim 12 in which said sensing means is a float which rises and falls with the level of the liquid in said inlet passage, and said signaling means is a switch operated by said float and operable to activate said rotating mechanism when the fluid rises to a predetermined level.

15. A magnetic separator having, in combination, a tank, two disks rotatably supported in spaced side-by-side relation with the lower portions of said disks in said tank, means for creating a flow of liquid containing magnetic particles through said tank and between said lower portions, magnetic means on said disks for collecting magnetic particles along radially spaced, substantially continuous inner and outer annular areas of the opposed end walls of said disks, means for rotating said disks in one direction through the liquid in said tank to pick up particles therein and carry the particles upwardly out of the liquid, and a plow disposed between said disks with the opposite edges of the plow closely adjacent said disk walls, said plow having an outer portion disposed in the path of particles collected along said outer area and inclined outwardly in the direction of rotation of said disks, and an inner portion disposed in the path of particles collected along said inner area and inclined upwardly and outwardly in the direction of the rotation of said disks whereby magnetic particles collected on both areas are deflected out of the space between said disks, said inner plow portion being disposed at a steep enough slope to accumulate particles in a mass above the level of said liquid and delay removal of the mass from between the disks while liquid drains from the mass.

16. A magnetic separator as defined in claim 15 further including a wiper mounted on said tank adjacent the tops of said disks and having portions in wiping contact with the peripheral surfaces of the disks to wipe accumulated magnetic particles and liquid from said surfaces.

17. A magnetic separator as defined in claim 16 in which said wiping portions are inclined and converge in the direction of rotation of said disks thereby to feed such particles and liquid into the space between said disks.

18. A magnetic separator as defined in claim 15 in which said outer portion has a lesser slope than said inner portion to deflect both collected masses gradually outwardly between said disks and squeezes the two masses between the disks prior to removal.

19. A magnetic separator as defined in claim 18 further including a downwardly inclined discharge chute having an upper end adjacent the upper end of said outer plow portion, said plow including a third portion inclined downwardly along the top of said chute to deliver collected particles onto the chute, and a member fast on said plow and extending along the underside of said chute closely adjacent the latter whereby said chute supports said plow cantilever fashion between said disks.

References Cited

UNITED STATES PATENTS

| | | | |
|---|---|---|---|
| 402,684 | 5/1889 | Maxim | 209—222 X |
| 731,443 | 8/1951 | Eriksson | 209—222 |
| 2,564,515 | 8/1951 | Vogel | 210—222 X |
| 2,688,403 | 9/1954 | Anderson | 210—222 |
| 2,736,432 | 2/1956 | Gardes | 210—222 |
| 2,758,715 | 8/1956 | Fowler | 210—222 |

REUBEN FRIEDMAN, *Primary Examiner.*

SAMIH N. ZAHARNA, *Examiner.*

F. W. MEDLEY, *Assistant Examiner.*